United States Patent [19]

Krans et al.

[11] Patent Number: 4,679,528
[45] Date of Patent: Jul. 14, 1987

[54] HEATING BOILER HAVING A VERTICAL BURNER TUBE

[75] Inventors: Peter Krans, Ugchelen; Hermanus J. Meuleman, Apeldoorn, both of Netherlands

[73] Assignee: Remeha Fabrieken B.V., Apeldoorn, Netherlands

[21] Appl. No.: 834,156

[22] Filed: Feb. 27, 1986

Related U.S. Application Data

[63] Continuation of Ser. No. 672,625, Nov. 19, 1984, abandoned.

[30] Foreign Application Priority Data

Nov. 24, 1983 [NL] Netherlands .................. 8304041

[51] Int. Cl.⁴ .................. F22B 21/00; F22B 9/02
[52] U.S. Cl. .................. 122/367 C; 431/328; 122/19; 122/161; 122/367 R
[58] Field of Search ............. 122/367 R, 367 C, 16, 122/19, 20 B, 13 R, 161, 166 R, 92 AC; 431/328

[56] References Cited

U.S. PATENT DOCUMENTS

| 1,919,285 | 7/1933 | Wetherbee | 431/328 |
|---|---|---|---|
| 2,832,320 | 4/1958 | Thome et al. | 122/161 |
| 3,088,271 | 5/1963 | Smith | 431/328 |
| 3,254,695 | 6/1966 | Brodlin | 431/328 |
| 3,701,340 | 10/1972 | Miller | 122/367 C |
| 3,707,142 | 12/1972 | Kobayashi | 122/85 B |
| 4,055,152 | 10/1977 | Vidalenq | 122/367 C |
| 4,134,739 | 1/1979 | Gulden et al. | 431/328 |
| 4,222,350 | 9/1980 | Pompei | 122/367 C |
| 4,282,833 | 8/1981 | Giesen | 122/161 |
| 4,401,058 | 8/1983 | Charrier et al. | 122/367 C |
| 4,449,485 | 5/1984 | Tan | 122/367 C |
| 4,453,498 | 6/1984 | Juhasz | 122/367 R |
| 4,465,025 | 8/1984 | Schroder | 122/19 |

FOREIGN PATENT DOCUMENTS

| 1964178 | 7/1970 | Fed. Rep. of Germany. |
| 2506910 | 12/1982 | France. |
| 7506250 | 5/1975 | Netherlands. |

*Primary Examiner*—Henry C. Yuen
*Attorney, Agent, or Firm*—Kenyon & Kenyon

[57] ABSTRACT

A heating boiler having a vertical, completely premixing burner tube arranged in a space shut off at the top includes concentrically relative to the burner tube a helical water tube surrounded by an upwardly extending flue gas discharge jacket. The burner tube comprises a lower circumferentially closed tubular mixing portion and an upper portion having burner ports formed by a plurality of stacked alternately flat and radially corrugated annular discs held together by a flat top plate connected through a bolt or the like to a cross piece or the like wedged in an internally tapered upper end of the circumferentially closed tubular mixing portion.

5 Claims, 2 Drawing Figures

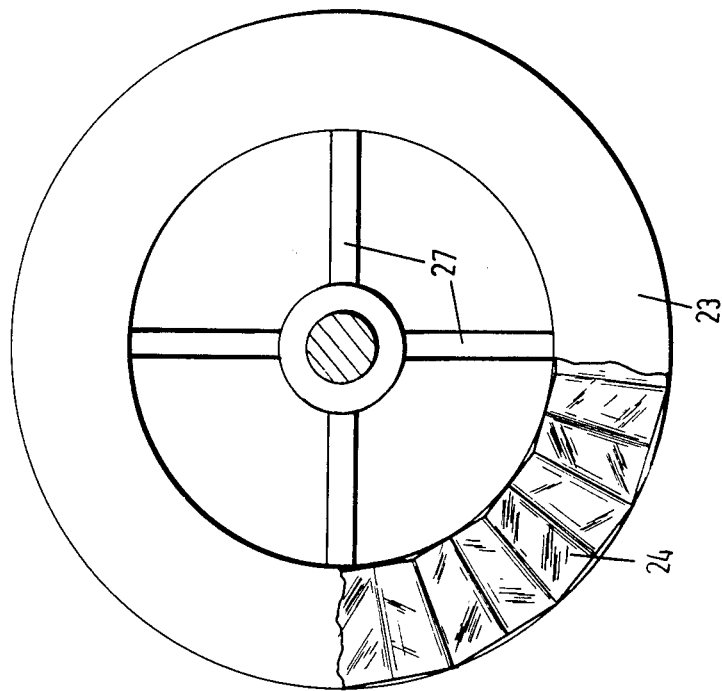
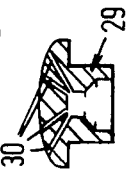
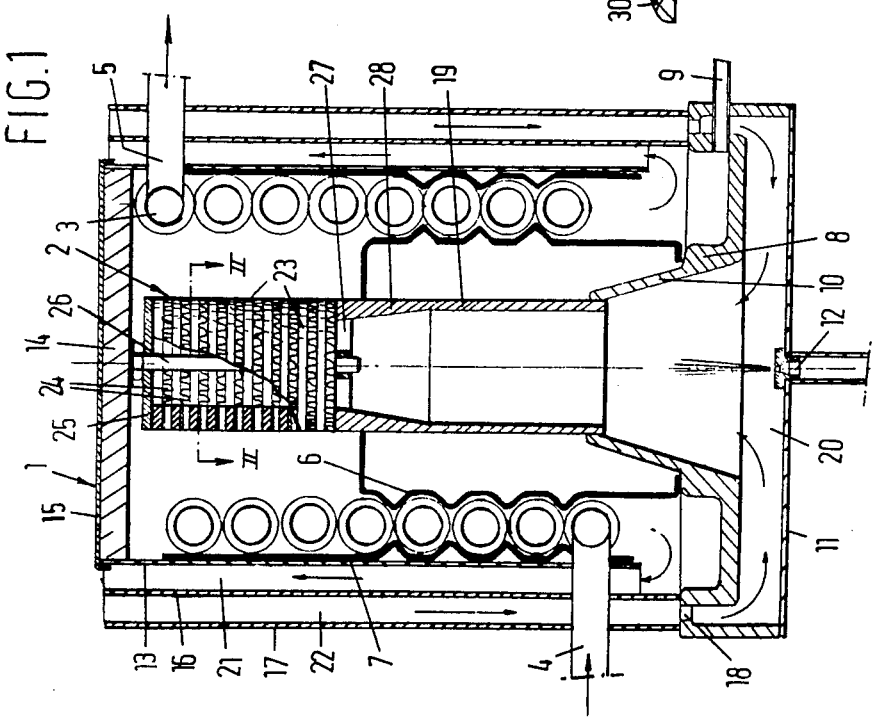

HEATING BOILER HAVING A VERTICAL BURNER TUBE

This application is a continuation of application Ser. No. 672,625, filed 19 Nov. 1984, now abandoned.

The invention relates to a heating boiler having a vertical, completely premixing burner tube provided with a lower circumferentially closed tubular mixing portion and arranged in a space shut off at the top, in which space there are arranged concentrically relative to the burner tube a helical water tube and externally of said helical tube an upwardly extending flue gas discharge jacket.

In such a boiler disclosed in Dutch application 7506250 laid open to public inspection, the burner tube comprises a lower circumferentially closed tubular mixing portion and an upper tube portion perforated with a plurality of small circular gas passages. Furthermore, the flue gas discharge jacket disposed around the helical tube comprises a plurality of helically arranged flue gas discharge openings via which the hot flue gas flowing across the helical tube is directly discharged.

It is an object of the present invention not only to increase the efficiency of such a boiler, but moreover to reduce the chance of flame flashback or blow off. Furthermore, a simple easily assembled construction is contemplated. Besides, it is the object to provide a heating boiler adapted or suitable to operate under a large range of loads in an optimal way.

To this effect, the heating boiler according to the invention is characterized in that the upper part of the burner tube comprises a plurality of alternate flat and radially corrugated annular discs of substantially equal inner and outer diameters, with the lower closed tubular mixing portion having such a length and diameter and the inflow opening of the mixing portion being designed so as to ensure complete premixing.

It is observed in this respect that German Offenlegungsschrift No. 1,964,178 discloses per se a burner tube provided with a plurality of alternate flat and radially corrugated annular discs. This prior art apparatus concerns a radiant burner requiring secondary air. Moreover, the temperature at the outflow opening is comparatively low; if this were not the case, the projecting portions of the respective annular discs would burn off.

It is observed that the construction according to the invention ensures proper premixing, resulting in not only a short flame (thus enabling a compact construction) but moreover an optimum combustion process and a slighter chance of flame flashback or flame blow off.

An optimum mixing of the combustion gas mixture is obtained when the lower circumferentially closed tubular mixing portion adjacent and in the direction of its connection to the upper portion consisting of annular discs tapers conically inward; any laminar flow layer present along the wall of said mixing portion is eliminated thereby.

In a further embodiment of the invention the alternate discs can be held together by a flat top plate connected by means of a bolt or the like to an externally conical cross piece or the like, received in the internally conically tapered upper end of the circumferentially closed tubular mixing portion. As a result, there is obtained not only a convenient assembly, but likewise there is ensured a contribution to the proper mixing by the inward taper of the interior upper end of the circumferentially closed tubular mixing portion.

The heating boiler can furthermore have a very simple design by mounting an annular bottom closure member in the form of a condensate trough having a drain outlet underneath the flue gas discharge jacket and/or the helical tube, which trough extends towards the center of the boiler and connects by means of a conical portion with the lower end of the burner tube. A space underneath the trough and the burner tube is shut off by a second bottom closure member in the form of a plate or the like, wherein a fuel nozzle is concentrially arranged.

The efficiency of the boiler can be increased by mounting around the flue gas discharge jacket an air supply jacket which is in open communication at its lower end with the space underneath the trough wherein the fuel nozzle is arranged; as a result, intake air preheating is obtained.

Additional ease of assembly is obtained when at least part of the helical tube is bounded on at least one of its outer and inner sides by an at least partly threaded bush. This ensures that the exhaust gases flow closely along the windings of the helical water tube, particularly when the helical tube adjacent the lower tubular mixing portion is bounded both on the inside and on the outside by said threaded bushes, with the inner bush being supported on the condensate discharge trough.

Furthermore, use is made of a fuel nozzle whose injection direction is at least partly radially oriented, so that a better mixing is obtained than is the case in the prior art axial injection.

It will be clear that a great many variants are possible within the scope of the invention. For instance, the flat and corrugated discs, together bounding the burner ports, may have a round as well as a polygonal design. Besides, the helical tube destined for water may both be smooth and finned.

For the sake of completeness, it is observed that the English magazine "British Gas", volume 44, No. 313 of July/August 1980, discloses per se a horizontal burner, wherein the burner ports are formed by alternately arranged flat and corrugated strips. This arrangement does not change the burner port's cross-section and does not achieve the effect obtained with the invention either, i.e. of a slighter chance of flame flashback or flame blow off.

One embodiment of the heating boiler according to the invention will now be explained, by way of example, with reference to the accompanying drawing, in which:

FIG. 1 is a diagrammatic longitudinal section of a heating boiler;

FIG. 2 is a cross-section on the line II—II of FIG. 1; and

FIG. 3 shows a different embodiment of the fuel nozzle of the heating boiler.

As shown in the drawing, a heating boiler 1 is provided with a burner tube 2. Around the burner tube there is arranged a finned helical tube 3 having a water inlet end 4 extending outwardly from the boiler and a water outlet end 5. The helical tube is enclosed between a helically corrugated inner bush 6 and a partly correspondingly corrugated outer bush 7. The upper end of the inner bush 6 is formed with an inner flange which fits against the outer circumference of a lower imperforate portion 19 of the burner tube 2, and the lower end is supported on an inner edge of an annular condensate discharge trough 8, which is fitted with a drain tube 9. The annular trough is provided on the inside with a frusto conical portion 10, which is fixedly connected to the lower end of the burner tube 2. A space 20 underneath the condensate trough and the burner tube is shut off by a bottom plate 11 carrying a centrally mounted fuel nozzle 12. As furthermore shown in the drawing, a jacket 13 provided around the partly corrugated outer bush 7 is shut off at the top by an insulating plate 14 retained by means of a metal cap 15.

Outwardly of the jacket 13, there are spaced apart two jackets 16, 17, between which two jackets air can be supplied which communicates through openings 18 adjacent the condensate discharge trough 8 with the space 20 bounded by the bottom plate for supply of primary air to the lower end of the burner tube.

Both the space 21 between the jackets 13 and 16, through which the flue gas discharge takes place, and the space 22 between the jacket 16 and 17, through which the supply of primary air takes place, are accurately maintained, since a plurality of stiffening baffles, not further indicated, are provided between the jackets.

The burner tube 2 comprises substantially the circumferentially closed lower portion 19 and an upper portion having burner ports. The burner ports are formed by a plurality of alternately arranged flat and radially corrugated plates 22, 24. These plate are held together by means of a top disc 25, connected by means of a centrally arranged bolt 26 to a cross piece 27, the tapered outer ends of which are wedged against a mating internally tapered upper end 28 of the closed tubular portion 19 of the burner tube.

The construction above described has a great many advantages:

For instance, no separate mixing tube is necessary, since partly due to the flow resistance provided by the flat and corrugated rings, a proper mixing is effected, so that a proper flame distribution is produced. The resulting flared burner ports reduce the chance of flame flashback or flame blow off. The apparatus has furthermore been found suitable for different types of natural gases, so that the attendant cost can be minimized. It has for instance been found that through application of a fuel nozzle 29, as shown in FIG. 3, a still better mixing is obtained. The nozzle 29 contains a plurality of outwardly inclined openings 30, which ensure a radial component to the outflow or injection of the gas supplied. Naturally, also combinations of the passages in nozzles 12 and 29, respectively shown in FIGS. 2 and 3, are possible.

It is finally observed that a great many alterations are possible without departing from the scope of the invention.

What we claim is:

1. A heating boiler having a vertical axis and including, arranged concentrically with said axis, a completely premixing gas burner tube having a lower circumferentially closed premixing portion, with an upper end and a lower end, and an upper portion provided with a plurality of burner ports extending through the tube wall with inlets on the inside circumferential surface of the tube and outlets on the outside circumferential surface of the tube, the outside circumferential surface serving as a flame supporting surface; means for delivering a mixture of gaseous fuel and sufficient combustion air to burn the fuel completely to the lower portion of the burner tube; a helical water tube surrounding the burner tube; an enclosure surrounding the water tube and having a closed upper end; a flue gas discharge jacket surrounding and radially spaced from the enclosure; an annular bottom closure member mounted underneath the helical water tube and sealingly connected to both the flue gas discharge jacket and the lower portion of the burner tube; and means for guiding combusted fuel and air from the burner ports to the space between the enclosure and the flue gas discharge jacket, wherein the improvement comprises:

the lower circumferentially closed premixing portion having a length and a diameter such that complete premixing of fuel and combustion air is assured;

the upper portion of the burner tube being an assembly of stacked alternately flat and radially corrugated annular discs forming said plurality of burner ports such that the inlet areas of said ports are smaller than the outlet areas, the discs having substantially equal inner and outer diameters, and the upper portion of the burner tube further including means for holding the stacked discs together and for attaching the stacked discs to the lower portion of the burner tube;

the annular bottom closure member comprising a condensate trough having a drain outlet;

a fuel nozzle mounted below said annular bottom closure member;

the connection between the annular bottom closure member and the lower portion of the burner tube comprising an upwardly extending passage coaxial with the vertical axis and tapering inwardly toward the lower end of the lower portion of the burner tube; and the interior surface of the burner tube tapers inwardly toward the upper end of the lower portion, and wherein the means for holding the stacked disc together comprises a flat plate placed on top of the stack of discs, a cross piece disposed in the tapered region of the lower portion of the burner tube, the cross piece having angles ends which matingly fit against the tapered interior surface of the burner tube, and a tension bolt connecting the flat plate to the cross piece.

2. A heating boiler according to claim 1 wherein the means for delivering a mixture of fuel and combustion air to the lower portion of the burner tube further comprises an air supply jacket coaxially surrounding and radially spaced from the flue gas discharge jacket and having a lower end sealingly connected to the second bottom closure member, the space between the air supply jacket and the flue gas discharge jacket providing an annular preheating passage for downward flowing combustion air, the lower end of said preheating passage communicating with the space between the condensate trough and the second closure member.

3. A heating boiler according to claim 1 wherein the means for guiding combusted fuel and air from the burner ports to the space between the enclosure and the flue gas discharge jacket comprises an inner bush disposed coaxially and closely adjacent to the inner side of the helical water tube, at least a portion of the inner bush being helically corrugated to correspond with adjacent helical coils of the water tube, the inner bush having a lower end supported on the condensate trough and an upper end that substantially sealingly contacts the outer periphery of the burner tube adjacent to the upper end of the lower portion of the burner tube, such that combusted gas from the burner ports are directed by said inner bush to flow downwardly past the helical coils of the water tube.

4. A heating boiler having a vertical axis and including, arranged concentrically with said axis, a burner tube having a lower circumferentially closed premixing portion, with an upper end and a lower end, and an upper portion provided with a plurality of burner ports; means for delivering a mixture of fuel and sufficient combustion air to burn the fuel completely to the lower portion of the burner tube; a helical water tube surrounding the burner tube; an enclosure surrounding the water tube and having a closed upper end; a flue gas discharge jacket surrounding and radially spaced from the enclosure; an annular bottom closure member mounted underneath the helical water tube and sealingly connected to both the flue gas discharge jacket and the lower portion of the burner tube; and means for guiding combusted fuel and air from the burner ports to the space between the enclosure and the flue gas discharge jacket, wherein the improvement comprises:

the upper portion of the burner tube being an assembly of stacked alternately flat and radially corrugated annular discs forming said plurality of burner ports such that the inlet areas of said ports are smaller than the outlet areas, the discs having substantially equal inner and outer diameters, and the upper portion of the burner tube further including means for holding the stacked discs together and for attaching the stacked discs to the lower portion of the burner tube;

wherein the means for delivering a mixture of fuel and combustion air to the lower portion of the burner tube comprises a second bottom closure member mounted in axially spaced relation below the condensate drain and the fuel nozzle is mounted coaxially on an upper surface of the second bottom closure member, the space between the second bottom closure member and the condensate trough forming an annular passage for directing radial inflow of fresh combustion air toward the nozzle for mixture with fuel injected through the nozzle; and wherein the means for guiding combusted fuel and air from the burner ports to the space between the enclosure and the flue gas discharge jacket comprises:

an inner bush disposed coaxially and closely adjacent to the inner side of the helical water tube, at least a portion of the inner bush being helically corrugated to correspond with adjacent helical coils of the water tube, the inner bush having a lower end supported on the annular bottom closure member and an upper end that substantially sealingly contacts the outer periphery of the burner tube adjacent to the upper end of the lower portion of the burner tube, such that combusted gas from the burner ports is directed by said inner bush to flow downwardly past the helical coils of the water tube; and an outer bush disposed coaxially and closely adjacent to the outer side of the helical water tube, at least a portion of the outer bush being helically corrugated to correspond with the helical coils of the water tube adjacent to the corrugations of the inner bush.

5. A heating boiler having according to claim 9, wherein the means for delivering a mixture of fuel and combustion air to the lower portion of the burner tube comprises a second bottom closure member mounted in axially spaced relation below the condensate drain and the fuel nozzle is mounted coaxially on an upper surface of the second bottom closure member, the space between the second bottom closure member and the condensate trough forming an annular passage for directing radial inflow of fresh combustion air toward the nozzle for mixture with fuel injected through the nozzle.

* * * * *

UNITED STATES PATENT AND TRADEMARK OFFICE
CERTIFICATE OF CORRECTION

PATENT NO. : 4,679,528
DATED : 14 July 1987
INVENTOR(S) : Peter Krans et al.

It is certified that error appears in the above-identified patent and that said Letters Patent is hereby corrected as shown below:

Col. 2, line 12: change "concentrially" to --concentrically--.

Col. 2, line 37: change "both be" to --be both--.

Col. 4, line 38: change "angles" to --angled--.

Col. 6, line 27: change "claim 9" to --claim 1--; after "boiler" delete "having".

Signed and Sealed this

Second Day of February, 1988

*Attest:*

DONALD J. QUIGG

*Attesting Officer*  *Commissioner of Patents and Trademarks*